United States Patent [19]

Gaus et al.

[11] Patent Number: 4,722,246
[45] Date of Patent: Feb. 2, 1988

[54] PLANET WHEEL POWER DIVIDER FOR MOTOR VEHICLES

[75] Inventors: Hermann Gaus, Stuttgart; Wolfgang Zaiser, Steinheim, both of Fed. Rep. of Germany

[73] Assignee: Daimler-Benz Aktiengesellschaft, Stuttgart, Fed. Rep. of Germany

[21] Appl. No.: 3,458

[22] Filed: Jan. 15, 1987

[30] Foreign Application Priority Data

Jan. 15, 1986 [DE] Fed. Rep. of Germany ....... 3600872

[51] Int. Cl.⁴ .......................... F16H 37/06; F16H 1/42
[52] U.S. Cl. ......................................... 74/705; 74/674; 74/714; 180/247; 180/248
[58] Field of Search .................. 74/705, 714, 695, 694, 74/674, 720–725, 682; 180/247, 248

[56] References Cited

U.S. PATENT DOCUMENTS

| | | | |
|---|---|---|---|
| 3,383,953 | 5/1968 | Christenson | 74/714 X |
| 3,492,890 | 2/1970 | Hill et al. | 74/714 |
| 3,908,775 | 9/1975 | Van Fossen | 180/44 R |
| 4,074,591 | 2/1978 | Dick | 74/674 |
| 4,353,270 | 10/1982 | Falzoni | 74/714 X |
| 4,458,557 | 7/1984 | Hayakawa | 180/247 X |
| 4,650,202 | 3/1987 | Tsuzuki | 74/714 X |

FOREIGN PATENT DOCUMENTS 3525707 1/1986 Fed. Rep. of Germany .

*Primary Examiner*—Dirk Wright
*Attorney, Agent, or Firm*—Barnes & Thornburg

[57] ABSTRACT

A planet-wheel power divider operates with a planet carrier and other transmission members in the form of three central wheels, with an input shaft connected to one central wheel, with an output shaft drivingly connected to one central wheel, with an output shaft drivingly connected to one of the other three transmission members and arranged centrally relative to the main axis. A second coaxial output shaft in the form of a hollow shaft is used to drive a parallel auxiliary drive shaft and can be coupled alternately to two of the three transmission members by shiftable clutches. A main planet meshes with an auxiliary planet and an outer central wheel, used for the constant connection to the input shaft, and an inner central wheel meshes with the main planet and a further inner central wheel meshes with the auxiliary planet.

So that the power divider can be shifted under load to change the torque distribution to the output shafts and to ensure the same torque direction on both output shafts, the hollow shaft is connected to the planet carrier and to the inner central wheel meshing with the main planet by means of respective frictional clutches shiftable under load and the central output shaft is connected to the inner central wheel which meshes with the auxiliary planet.

6 Claims, 1 Drawing Figure

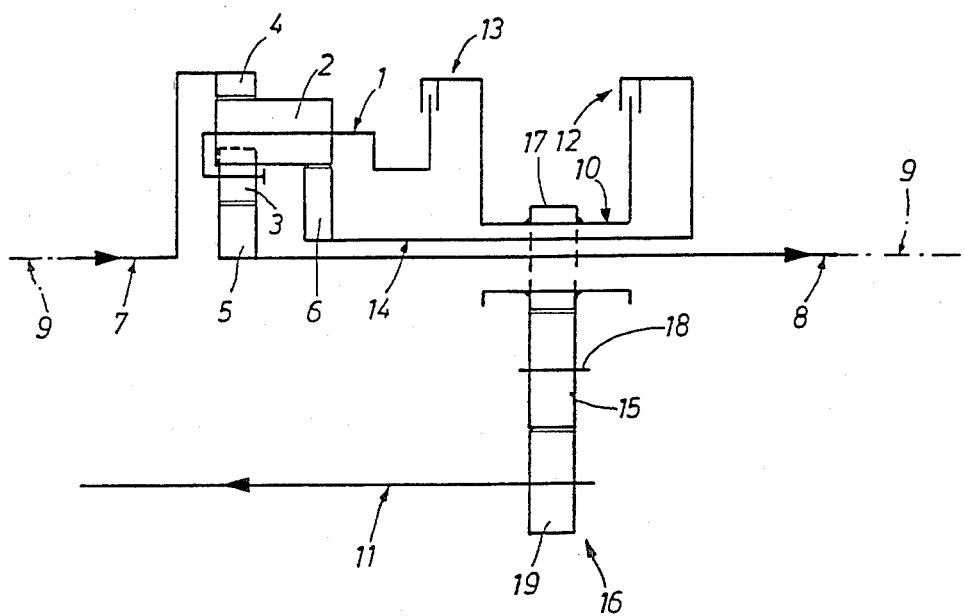

PLANET WHEEL POWER DIVIDER FOR MOTOR VEHICLES

BACKGROUND AND SUMMARY OF THE INVENTION

The invention relates to a power divider for dividing power between two output shafts of the type having a planet carrier and three central wheels, with an input shaft connected to one of the central wheels and a central output shaft for driving an axle of the motor vehicle drivingly connected to one of the other central wheels. A second output shaft can be coupled by means of friction clutches to the planet carrier for driving a second axle of the motor vehicle.

A power divider of this type is described in German Offenlegungsschrift No. 3,525,707, now previously published. The aim of this power divider is to allocate the drive torque to the two output shafts in a ratio of 1:1. For this purpose, the planet carrier is both connected constantly to the central output shaft and can be coupled, together with the inner central wheel meshing with the auxiliary planet, to the other output shaft designed as a hollow shaft, each by means of a positive clutch. Additionally, the inner central wheel meshing with the main planet can be fixed non-rotatably relative to the housing by means of a positive take-up toothing, in order to obtain an additional slow transmission stage for a longitudinally blocked all-wheel drive. In this power divider, the two positive clutches connected to the output shaft designed as a hollow shaft are not used to obtain two torque distributions different from 1:1 to the two output shafts, but to select a fast transmission stage for all-wheel drive, on the one hand with compensation and on the other hand with the planetary gear blocked.

The object on which the invention is based is essentially to make it possible to change over under load in order to vary the torque distribution to the driven axles, and to ensure the same torque direction on both driving axles.

According to the invention, the object explained above is achieved by providing a power divider having a central output shaft connected to the inner central wheel that meshes with the auxiliary planet and having a second output shaft connected to both the planet and the inner central wheel meshing with the main planet by respective clutches.

Other objects, advantages and novel features of the present invention will become apparent from the following detailed description of the invention when considered in conjunction with the accompanying drawing.

BRIEF DESCRIPTION OF THE DRAWING

The single drawing shows a diagrammatic representation of a preferred embodiment of the invention.

DETAILED DESCRIPTION OF THE DRAWING

An input shaft 7 which can be driven from an engine via a gear-change transmission, for example an automatically shifting planet-wheel gear-change transmission, is connected fixedly in terms of rotation to an outer central wheel 4 which, like an inner central wheel 6, meshes with a longer main planet 2 mounted rotatably on a planet carrier 1. The main planet 2 meshes with a shorter auxiliary planet 3 which is likewise mounted rotatably on the planet carrier 1 and which itself meshes with an inner central wheel 5. Inner central wheel 5 is connected fixedly in terms of rotation to an output shaft 8 which is central relative to the main axis of rotation 9—9 and which leads to the axle drive of a vehicle axis.

The planet carrier 1 is connected, via a shiftable friction clutch 13, to an outer hollow shaft 10 which is used as an output shaft and carries an input gearwheel 17 fixed in terms of rotation relative to the output shaft and belonging to an intermediate transmission 16. An inner hollow shaft 14 passes through the output shaft 10. The inner hollow shaft 14, through which the output shaft 8 passes, connects the inner central wheel 6 to a second shiftable friction clutch 12. The second shiftable friction clutch 12 is located on the side of the intermediate transmission 16 opposite the transmission members 1 to 6 and is connected to the hollow shaft 10 used as an output shaft.

The input gearwheel 17 meshes with an intermediate gearwheel 15 which is mounted on an intermediate shaft 18 and which itself meshes with an output gearwheel 19 of the intermediate transmission 16. The output gearwheel 19 is connected fixedly in terms of rotation to an auxiliary drive shaft 11. The axis of auxiliary drive shaft 11 is parallel to the main axis of rotation 9—9 and leads to the axle drive of a further vehicle axle.

The output shaft 8 is constantly driven by the inner central wheel 5, whereas the auxiliary drive shaft 11 can be driven either by the inner central wheel 6 as a result of the engagement of the friction clutch 12, in which case the torque distribution to the shaft 8 and auxiliary drive shaft 11 can be in the ratio of approximately 73% to 27%, or by the planet carrier 1 as a result of the engagement of the friction clutch 13, in which case the torque distribution can be, for example, in the ratio of approximately 49% to 51%.

When both friction clutches 12 and 13 are engaged, the transmission members 1 to 6 consequently rotate as a single unit. Under these circumstances, either both vehicle axles are driven or, as a result of the release of a further friction clutch (not shown), only one of the vehicle axles is driven.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Planet-wheel power divider for motor vehicles, including as transmission members, a planet carrier having a main planet meshing with an auxiliary planet, an outer central wheel and first and second inner central wheels, said first inner central wheel meshing with the main planet and said second inner central wheel meshing with the auxiliary planet, an input shaft drivable by an engine and fixedly connected in terms of rotation to the outer central wheel, an output shaft drivingly connected to one of the other transmission members and centrally arranged relative to a main axis of rotation of the power divider, and a coaxially arranged second output shaft in the form of a hollow shaft for driving an auxiliary drive shaft parallel to the main axis of rotation and being couplable by shiftable clutch means to two of the transmission members, wherein the second output shaft is connected to the planet carrier and to the first inner central wheel by means of first and second friction clutches shiftable under load, and the central output shaft is connected to the second inner central wheel.

2. Power divider according to claim 1, wherein the first and second friction clutches are jointly engageable.

3. Power divider according to claim 1, wherein the auxiliary planet is axially between the input shaft and the first central wheel.

4. Power divider according to claim 1, wherein the first and second clutches are on the respective axial sides of the second output shaft, said first clutch is axially between the transmission members and the second output shaft, and wherein the second clutch is connected to the first inner central wheel by an inner hollow shaft, said inner hollow shaft is within the second output shaft.

5. Power divider according to claim 1, wherein the first friction clutch is axially between the transmission members and the second output and connected to the planet carrier.

6. Power divider according to claim 1, wherein the second output shaft is connected to the auxiliary drive shaft via an intermediate transmission having at least one intermediate gearwheel.

* * * * *